United States Patent
York et al.

(10) Patent No.: US 12,056,262 B2
(45) Date of Patent: Aug. 6, 2024

(54) APPLYING TRUSTED BACKUP CONFIGURATION TO A NODE

(71) Applicant: Hewlett Packard Enterprise Development LP, Spring, TX (US)

(72) Inventors: Justin York, Cypress, TX (US); Brian Collum, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 168 days.

(21) Appl. No.: 17/822,480

(22) Filed: Aug. 26, 2022

(65) Prior Publication Data
US 2024/0070329 A1    Feb. 29, 2024

(51) Int. Cl.
G06F 21/56    (2013.01)
G06F 21/72    (2013.01)
G06F 21/73    (2013.01)

(52) U.S. Cl.
CPC ............ *G06F 21/73* (2013.01); *G06F 21/568* (2013.01); *G06F 21/72* (2013.01)

(58) Field of Classification Search
CPC ......... G06F 21/73; G06F 21/568; G06F 21/72
See application file for complete search history.

(56) References Cited

U.S. PATENT DOCUMENTS

| | | | |
|---|---|---|---|
| 7,302,698 B1* | 11/2007 | Proudler | G06F 21/57 726/2 |
| 10,691,803 B2 | 6/2020 | Liguori et al. | |
| 10,997,297 B1 | 5/2021 | Lin | |
| 2005/0039016 A1 | 2/2005 | Aissi et al. | |
| 2013/0124932 A1* | 5/2013 | Schuh | G11C 29/16 714/718 |
| 2023/0359525 A1* | 11/2023 | Suryanarayana | G06F 9/4401 |

OTHER PUBLICATIONS

HPE, "Enablement for IEEE 802.1X-Based Server Onboarding, HPE iLO adds support for IEEE 802.1X and DevID certificates", Technical white paper, Jul. 2021, 8 Pages.
HPE, "HPE Gen10 and Gen10 Plus Security Reference Guide", Edition: 2, Mar. 2022, 121 Pages.
HPE, "HPE iLO 5 1.40 User Guide", Edition: 1, Feb. 2019, 764 Pages.

(Continued)

*Primary Examiner* — Nelson S. Giddins
(74) *Attorney, Agent, or Firm* — Hewlett Packard Enterprise Patent Department

(57) ABSTRACT

Examples to restore a trusted backup configuration for a node. Example techniques include failover to an alternate firmware of the node, in response to an unverifiable condition of an existing firmware of the node. The node may validate a first configuration file stored in the node. The first configuration file includes a first backup configuration. The node may validate a second configuration file stored in the node based on the validation of the first configuration file. The second configuration file includes a second backup configuration. In response to the validation of at least one of the first configuration file and the second configuration file, the node may select one of the first backup configuration and the second backup configuration, and apply the selected backup configuration to the node.

20 Claims, 6 Drawing Sheets

(56) References Cited

OTHER PUBLICATIONS

HPE, "HPE iLO 5 2.65 User Guide", Edition: 1, Apr. 2022, 921 Pages.
Jones et al., "The Fundamentals of Secure Boot and Secure Download: How to Protect Firmware and Data Within Embedded Devices", Maxim Integrated, 2014, 6 pages.
Jones et al., "The Fundamentals of Secure Boot and Secure Download: How to Protect Firmware and Data Within Embedded Devices", Maxim Integrated, available online at <https://www.maximintegrated.com/en/design/technical-documents/app-notes/6/6426.html>, May 19, 2017, 7 pages.
Marco Carrer et al, "Securing the IoT begins with Zero-Touch Provisioning at Scale", Apr. 13, 2021, 12 Pages.
Trusted Computing Group, "TPM 2.0 Keys for Device Identity and Attestation", Version 1.00, Revision 12, Oct. 8, 2021, 71 Pages.
Trusted Computing Group, "TPM 2.0 Keys for Device Identity and Attestation", Version 1.00, Revision 2, Sep. 17, 2020, 68 Pages.

\* cited by examiner

200

FAILOVER, BY A PROCESSOR OF A NODE, TO AN ALTERNATE FIRMWARE OF A NODE, IN RESPONSE TO AN UNVERIFIABLE CONDITION OF AN EXISTING FIRMWARE OF THE NODE 205

VALIDATE, BY THE PROCESSOR EXECUTING THE ALTERNATE FIRMWARE, A FIRST CONFIGURATION FILE STORED IN THE NODE, WHERE THE FIRST CONFIGURATION FILE INCLUDES A FIRST BACKUP CONFIGURATION 210

VALIDATE, BY THE PROCESSOR EXECUTING THE ALTERNATE FIRMWARE, A SECOND CONFIGURATION FILE STORED IN THE NODE BASED ON VALIDATION OF THE FIRST CONFIGURATION FILE, WHERE THE SECOND CONFIGURATION FILE INCLUDES A SECOND BACKUP CONFIGURATION 215

IN RESPONSE TO VALIDATION OF AT LEAST ONE OF THE FIRST CONFIGURATION FILE AND THE SECOND CONFIGURATION FILE, SELECT, BY THE PROCESSOR, ONE OF THE FIRST BACKUP CONFIGURATION AND THE SECOND BACKUP CONFIGURATION, AND APPLY THE SELECTED BACKUP CONFIGURATION TO THE NODE. 220

*FIG. 2*

APPLYING TRUSTED BACKUP CONFIGURATION TO A NODE

BACKGROUND

A computing device, such as a server, can be configured to perform certain generic or specific operations or actions. A computing device may typically include software, firmware, hardware, or a combination thereof. The hardware of the computing device may include physical components including, one or more processors, a storage medium, input/output units, etc. The software can be a set of programs, procedures, algorithms, and/or instructions. An Operating System (OS) can be an example of software. Further, firmware can be a specific class of software that provides low-level control for specific hardware of the computing device. For example, the firmware may contain basic functions to provide hardware abstraction services to software (e.g., the OS).

It is often useful to authenticate various components of a computing device to prevent the operation of the computing device in a compromised state due to attacks. Among various components of a computing device that may be vulnerable to attacks, firmware may be compromised by unauthorized users, such as hackers. A firmware attack may occur before the start of a computing device whereby a user of a computing device may not be aware of the compromised state of the device. Further, an attacker may obtain access to hardware and/or software components of the computing device after the start of the device.

BRIEF DESCRIPTION OF THE DRAWINGS

The present disclosure, in accordance with one or more various examples, can be described in detail with reference to the following figures. The figures are provided for purposes of illustration only and merely depict examples, wherein:

FIG. 2 illustrates a flow diagram depicting a method of retrieving and applying backup configuration to a node, in accordance with various examples of the present disclosure;

Figure 1:
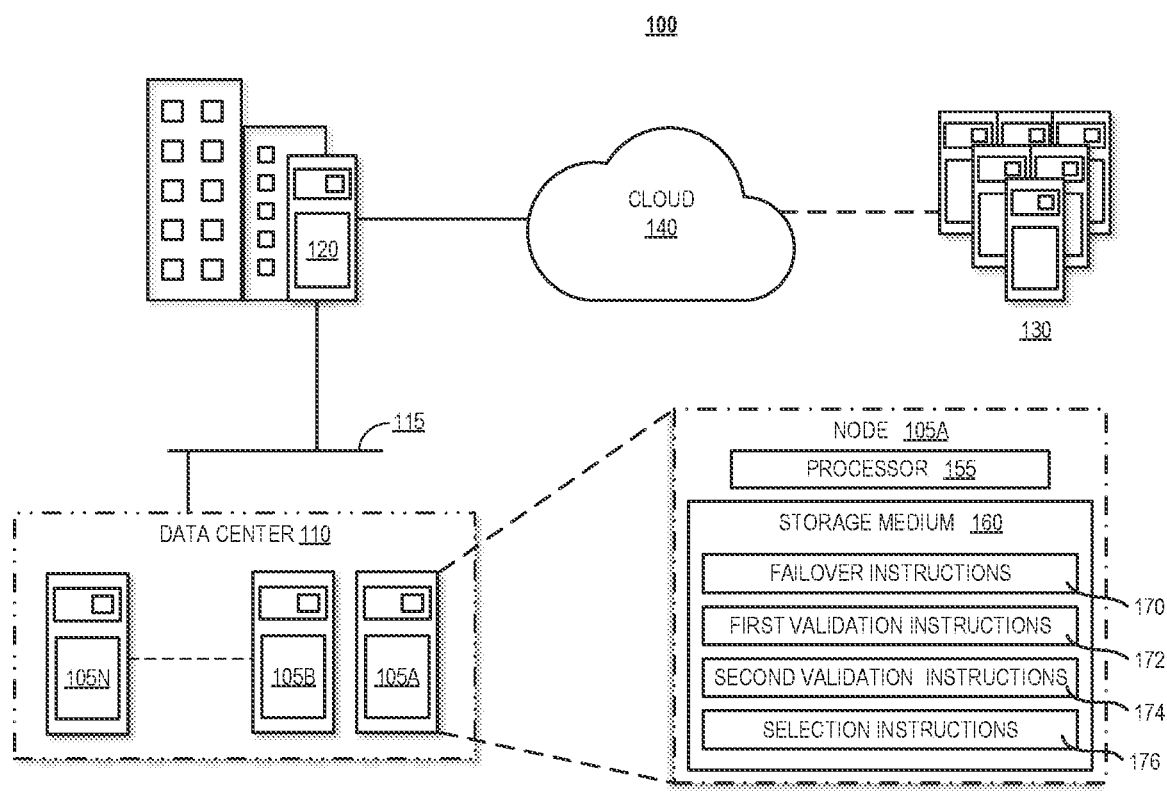
FIG. 1 illustrates a schematic view of a network environment, according to various examples of the present disclosure.

The figures are not exhaustive and do not limit the present disclosure to the precise form disclosed.

DETAILED DESCRIPTION

A zero-trust model may be used by certain computing devices to reduce the risk of starting the device with any compromised components. The zero-trust model may enable organizations, enterprises, or other users to reduce security risk, as a compromised device may be disabled from starting or joining a network. Simply put, computing devices with a zero-trust model do not rely on implied trust for intra-component interaction and/or inter-device interaction. In some examples, a zero-trust model may use hardware components to authenticate firmware and there can be a chain of authentications until the validation and execution of a high-level software (e.g., Operating System (OS)) is achieved.

A Hardware Root of Trust can be an example of a part of a zero-trust model. The Hardware Root of Trust may use a processor, such as a Central Processing unit (CPU) of a computing device, to authenticate a firmware before execution of firmware code. In some examples, a computing device may include more than one firmware and a firmware portion that is validated may go on to validate a subsequent firmware portion that is to be executed. A Hardware Root of Trust (HWRoT) may include a chain of trust actions that lead to the execution of an OS, which may be loaded by an OS boot loader. In some examples, for HWRoT validation, an immutable fingerprint (e.g., a digital fingerprint) may be used in hardware. Such a digital fingerprint may be used as a basis for validating firmware. Failure to validate may indicate that firmware is tampered with or modified from a trusted state. In one example, when a Hardware Root of Trust is unable to validate a firmware, the Hardware Root of Trust may disable the computing device from powering on.

In some devices, certain strategies may be used to avoid the execution of unverifiable firmware such as compromised firmware. Such strategies may include failing over to an alternate copy of firmware such that the alternate firmware can be validated and/or executed. Another strategy may include loading fresh firmware via removable storage or network storage by entering programming mode. However, there are certain shortcomings with such known strategies. For example, firmware may include configuration data, which can be set or updated during various stages of a computing device (e.g., manufacturing stage, deployment stage, etc.). Due to tamper detection, the computing device may failover to an alternate firmware. However, the alternate firmware may operate with configuration data that is compromised. Execution of such firmware may compromise the security of a computing device.

In order to mitigate the use of firmware with any compromised configuration, some devices may revert to a default configuration compiled into the firmware. In some examples, the default configuration can be a universal default configuration, which may not be specific to a node. The default configuration can be different and/or older when compared to a latest known trusted configuration of a firmware. Thus, a user/network administrator may have to switch to a recovery programming mode that enables loading the desired configuration manually into the firmware or manually resetting each firmware to the desired configuration. In such examples, a user may have to connect via a serial port to apply the desired configuration. Such a connection-based procedure can be cumbersome and costly when the node is deployed in a Co-Location (COLO) facility or a data center with restricted access, as the user may have to open a support ticket. In some other examples, a user may rely on protocols, such as Dynamic Host Configuration Protocol (DHCP) to detect and connect to a Baseboard Management Controller (BMC) of a node for reconfiguration, which can be insecure and prone to attacks. Nevertheless, the aforementioned processes can pose a challenge to enterprises, organizations, or individual users that operate at scale or may not be proficient in programming. Moreover, manual reconfiguration can be time-consuming, prone to errors and attacks, and devices may experience significant downtime thereby affecting services/applications and data.

The present disclosure provides techniques for zero-touch restoration of a secure firmware configuration when an existing firmware is detected to be compromised. Per the examples described herein, a backup of two or more trusted configurations is created and stored. The backup of trusted configuration is created at various stages of a node's lifecycle. According to some examples, a backup can be created at a manufacturing stage where a node is initially configured, another backup can be created at a first deployment where a configuration of the node is updated, and so forth. In the event of tamper detection or the like, an alternate firmware replaces an existing firmware of a computing device. The alternate firmware validates the two or more backup configurations. Based on such validation, a selected backup configuration out of the two or more configurations is applied to the computing device. In some examples, for the purposes of selection of backup configuration, a latest configuration file that incorporates a latest trusted configuration is validated. In case the latest configuration file is validated, then the corresponding trusted configuration is selected. In case of failed validation of the latest configuration file, an immediately prior configuration file that incorporates a prior trusted configuration may be selected. According to some examples, the techniques take advantage of a cryptographic identifier, such as an Institute of Electrical and Electronics Engineers (IEEE) 802.1AR Initial Device Identifier (IDevID), which is unique to a computing device and a Hardware Root of Trust for restoration of the selected configuration. In one example, the selected backup configuration can be created at a deployment stage and/or a manufacturing stage of the computing device.

Thus, per the present disclosure, a node can detect an unverifiable condition, validate a backup configuration, and apply a selected backup configuration with minimal or no intervention from a user. Multiple computing devices, such as servers or nodes, can be restored to a trusted configuration with minimal downtime. Further, a computing device may not rely on a universal default configuration or a backup firmware with a probably compromised configuration.

According to some examples of the present disclosure, for purposes of detecting whether an existing firmware of a computing device, such as a node, is tampered with, a Hardware Root of Trust (HWRoT) of the computing device may validate the existing firmware. Responsive to an unverifiable condition of the existing firmware, the HWRoT may cause a failover to an alternate firmware. In some examples, a node may include an HWRoT embedded with a digital fingerprint of firmware at the factory. During startup, the HWRoT verifies whether the firmware matches the digital fingerprint. If the firmware verification fails, the node performs techniques discussed herein for restoring the configuration of the node. In some examples, a tamper condition can lead to an unverifiable condition of the firmware. A processor of the node may execute the alternate firmware and upon achieving a start condition, may erase an existing configuration of the node. Further, the processor may execute the alternate firmware to retrieve and validate a first configuration file.

In one example, the first configuration file may store a first backup configuration, which is created during a first stage of the node. As used herein, "stage of node" may refer to a phase in the lifecycle of the node. For example, the first stage may refer to the manufacturing phase of the node that is prior to initial deployment. Similarly, the second stage may refer to a deployment phase after leaving a manufacturing facility. As used herein, "manufacturing phase" refers to an initial phase in a lifecycle of a node, which can be before shipping the node to a user, enterprise customer, or the like. In some examples, during the manufacturing phase, the node is in the care and custody of a manufacturer. As used herein, "deployment phase" refers to a phase subsequent to the manufacturing phase where a node is deployed on a customer premise, deployment site, a data center, a server farm, or the like. In one example, at the manufacturing phase, the node is in the care or custody of an entity other than the manufacturer.

Further, based on successful validation of the first configuration file, the processor may execute the alternate firmware to retrieve and validate a second configuration file. In one example, the second configuration file may store a second backup configuration, which is created during a second stage of the node. In some examples, the second stage is different from the first stage. In one example, the second stage can be at a later point in time than the first stage. Responsive to validation of the second configuration file, the processor executing the alternate firmware may determine that the second configuration file is not compromised. Further, the processor executing the alternate firmware may extract the second backup configuration from the second configuration file. The processor may apply the extracted configuration to the node thereby using a latest trusted configuration of the node. Further, unlike systems where a user/network administrator may have to manually reconfigure, connect to the system using a serial port, or use an insecure connection(s), the system can reconfigure automatically or with limited assistance based on the techniques discussed herein. Further, some enterprises, organizations, or individual users may operate at a large scale with multiple nodes. In such setups, techniques of the present disclosure enable each node to check and reconfigure its configuration on its own motion. Each node can reconfigure to operate with its latest trusted configurations. Downtime of the nodes is reduced as manual intervention and/or sequential configuration is reduced/eliminated. The reduced downtime improves the running of applications and data access.

Whereas, responsive to failed validation of the second configuration file, the processor executing the alternate firmware may extract the first backup configuration from the first configuration file. The processor may apply the second backup configuration, which can be another trusted configuration. Thus, a node with compromised firmware is suspended from starting up in a compromised state. If a node starts up in a comprised state, an unauthorized user may gain access to its various sub-systems and data stored on the node. In some examples, a node may store sensitive data such as medical records, credit card information, personally identifiable information, and so forth and unauthorized access to such information can lead to catastrophic situations.

Further, in accordance with some examples, for verification purposes, an HWRoT of the node may use an immutable digital fingerprint that is embedded into the hardware of the node. The digital fingerprint may be used for the validation of existing firmware. Responsive to invalidation/failed validation, the HWRoT may failover to an alternate firmware. In some examples, failing over to the alternate firmware may include executing an alternate firmware code, reverting to a secure state with trusted firmware, or similar failover techniques. In a further example, the existing firmware may be stored on primary storage (e.g., Read-Only Memory (ROM), Flash, etc.) and the alternate firmware may be stored in backup storage or an emergency recovery partition of the node. Further, the alternate firmware upon starting may disregard and/or erase the existing configuration so that the alternate firmware can validate and apply a trusted backup configuration. A configuration file can be a tar file, a zip file, or other similar data storing file package formats.

Further, in accordance with some examples, the first configuration file may be created during the first stage, which can be the manufacturing stage of the node. That is, the first configuration file can be embedded with a first backup configuration, which is a configuration of the node before leaving the manufacturing facility. In one example, the node may be configured based on a system requirement and/or configuration information received by the manufacturer from a customer during the manufacturing stage. Further, per some examples, for purposes of validation of the first configuration file, the alternate firmware may use a first key compiled into the alternate firmware. In one example, the first key can be a public key of a key pair, which is generated during the manufacturing stage. Thus, the first key can be used to validate the first configuration file, which was signed using a private key of the key pair corresponding to the first key. According to some examples, the first configuration file is embedded with a second key along with the first backup configuration. In one example, the second key can be a code signing public key that corresponds to a user or enterprise using the node. Responsive to validation of the first configuration file, according to some examples, the alternate firmware may extract/retrieve the second key from the first configuration file.

According to some examples, for purposes of validating the second configuration file, the alternate firmware may use the second key extracted from the first configuration file. According to some examples, responsive to validation of the second configuration file, the alternate firmware may extract/retrieve the second backup configuration from the second configuration file. The retrieved second backup configuration can be applied to the node. Whereas, responsive to a failed validation of the second configuration file, the alternate firmware may retrieve the first backup configuration from the first configuration file. The first backup configuration can be applied to the node. Thus, per the examples herein, the alternate firmware can be restored with a selected configuration, which is one of the trusted configurations from customer deployment or a trusted configuration from the manufacturing stage.

According to some examples of the present disclosure, validating the first configuration file using the first key may include, validating a node identifier of the node. In one example, validating the node identifier may include determining that a node identifier is digitally signed by an authorized entity. Further, validating the first configuration file may include validating that a node identifier embedded into the first configuration file is identical to a node identifier provisioned to the node. The node identifier may be an identifier that is cryptographically bound to a device. In accordance with examples of the present disclosure, the node identifier may be an IDevID. An IDevID certificate contains binding information that is tied to the immutable identity of a node and then cryptographically digitally signed by the manufacturer of the hardware. The binding information may contain identifiers that specifically identify the physical attributes of the node. For example, the IDevID certificate for a particular node may have physical attributes, such as a node serial number, or similar unique references. Thus, for validating the node identifier, a serial number embedded into the node identifier may be checked to match an immutable serial number programmed into the node. As used herein, the computing device may be interchangeably referred to as a node. Further, aspects and features of the present disclosure are elaborated in the description for example illustrations.

Referring now to FIG. 1, an example of a network environment in which techniques disclosed herein might be implemented is illustrated. The network environment 100 may include a plurality of nodes 105A-105N deployed at a data center 110. Each node 105A, 105B, . . . , 105N can be a general purpose or a specific purpose server, as per some examples. The data center 110 may be connected via a network 115 to an enterprise. The enterprise may include a node 120 deployed on-premise. In some examples, the node 120 can be closer to a data source (e.g., at the Edge) when compared to the node 105A-105N deployed at the data center 110.

Further, in some examples, the network architecture 100 includes a private cloud formed by a farm of nodes 130. Such a configuration may be referred to as a server farm. Each node may be considered as a node that may be configured at the manufacturing facility, before shipping, and at the customer facility with customer desired settings. In some examples, the nodes 105A-150N may be storage servers configured to offer cloud storage to one or more users. In further examples, the plurality of nodes 105A-105N may be configured to support on-demand and/or scalable as-a-Service (aaS) applications, such as Storage-aaS (SaaS), Infrastructure-aaS (IaaS), Software-aaS (SasS), Platform-aaS (PaaS), or any other cloud-native services.

Further, in some examples, the plurality of nodes 105A-105N may be deployed at multiple physical or geographical sites. The network environment 100 may include a primary site in communication with the network 115. In one example, one or more nodes of the plurality of nodes 105A-105N may be deployed in the primary site. In some other examples, the network environment 100 may also include one or more remote sites that are in communication with the network 115. In one example, a cloud service provider with scalable resources may deploy one or more clusters (and cluster groups) that may spread across a primary site and one or more remote sites. As used herein, a 'cluster' may refer to a group of interconnected nodes that work together to support generic or specific application(s) and/or middleware.

In some examples, the network environment 100 may be a remote service network, such as a cloud service network. One or more client devices (not shown) may communicate with the nodes 105A-105N. The service network may correspond to storage, compute, networking, and/or any other computing services. The network environment 100 may act as a platform that provides scalable resources to the client devices.

Per some examples, each node 105A-105N may include a processor 155 and a storage medium 160 (illustrated for the node 105A). The processor 155 can fetch, decode, and execute instructions from the storage medium 160. The instructions when executed cause the processor 155 to perform one or more specific operations.

In the ongoing example, the node 105A may include a non-transitory machine-readable storage medium (e.g., the storage medium 160) that can store instructions 170-176. The instructions 170-176 may include failover instructions 170, first validation instructions 172, second validation instructions 174, and selection instructions 176, as per some examples. The node 105A may include one or more interface (s) (e.g., Network Interface Card (NIC), network port, wireless communication component, etc.) for communication with other devices or entities connected to the network 115.

According to some examples, the processor 155 may execute the failover instructions 170 that cause the processor 155 to failover to an alternate firmware of the node, which can be in response to an unverifiable condition of an existing firmware of the node 105A. As used herein, a "failover" is a procedure by which a system may rely on a backup when a fault/failure is detected. In some examples, an HWRoT may detect a tamper condition. In some examples, an HWRoT of the node 105A may perform the tamper detection operation. As used herein, a "Hardware Root of Trust (HWRoT)" is a security arrangement that employs a chain of cryptographic operations triggered within hardware to validate and transition to firmware and then to software. Further, HWRoT can be a secure component of a node that is immutable; hence, free from compromise by an unauthorized entity, such as a hacker, malware, and so forth. In conditions, such as access by an unauthorized entity, machine-readable instructions and/or configuration of the node may be altered. Without an HWRoT, these types of conditions may cause the node to start in a compromised state and may offer unauthorized access to data on the node.

According to some examples, the processor 155 may execute the first validation instructions 172 that cause the processor 155 to validate a first configuration file stored in the node 105A. The first configuration file includes a first backup configuration. In some examples, the first configuration file may be stored locally on the node 105A. In some other examples, the first configuration file may be stored remotely from the node 105A and is accessible by the node 105A via a secure connection.

According to some examples, the processor 155 may execute the second validation instructions 174 that cause the processor 155 to validate a second configuration file stored in the node 105A, based on the validation of the first configuration file. The second configuration file includes a second backup configuration. The second backup configuration can be a trusted configuration securely stored in the second configuration file.

According to some examples, the processor 155 may execute the selection instructions 176 that cause the processor 155 to in response to validation of at least one of the first configuration file and the second configuration file, select one of the first backup configuration and the second backup configuration, and apply the selected backup configuration to the node 105A. In some examples, based on successful validation of various configuration files, backup configuration from a latest validated configuration file may be selected for application to the node. In a further example, if validation of a configuration file fails, a backup configuration from an earlier validated configuration file may be extracted and applied. Further, the node 105A can be updated to a latest trusted configuration and can be made readily connectable to the node 105A with minimal downtime. Further, in some examples, each node/computing device illustrated in FIG. 1 can be similarly configured as the node 105A and can be capable of performing one or more instructions discussed herein.

FIG. 2 illustrates a flow diagram depicting method 200 of retrieving and applying backup configuration to a node, according to various examples of the present disclosure. In some examples, the method 200 may be encoded as instructions in a machine-readable storage medium. The instructions may be executed by a processor (e.g., the processor 155 of FIG. 1).

Now referring to method 200, according to some examples, at block 205, the processor may failover to an alternate firmware of the node. The failover operation may be in response to an unverifiable condition of an existing firmware of the node. As used herein, "existing firmware" refers to a default firmware of the node, which can be software routine(s) (e.g., code or instructions) stored on non-volatile memory that enables normal operation of a node/computing device. A firmware may define the behavior of a node from the moment it is switched ON and based on validation or verified condition of the firmware, control is passed on to an OS of the node. As used herein, an "unverifiable condition" may occur due to an intentional or unintentional modification of the default code of firmware of a node, which may compromise the integrity of the node. This can be, for example, as a result of tampering with the system. Whereas, the alternate firmware can be a trusted backup firmware of the node that can be used when existing firmware is compromised. In some examples, firmware may include hardware-initialization firmware, such as a Basic Input/Output System (BIOS) firmware and Unified Extensible Firmware Interface (UEFI) firmware, a BMC firmware, or other firmware types. As used herein, an "existing firmware" is a firmware of a node before attempting to upgrade the node to new firmware (e.g., an alternate firmware). The existing firmware and the alternate firmware may be implemented as a set of instructions stored in non-volatile memory. The processor may execute such instructions to perform one or more actions discussed herein.

At block 210, the processor may execute the alternate firmware to validate a first configuration file stored in the node. The first configuration file includes a first backup configuration. According to some examples, the process of validation may include verification of the integrity of the first configuration file. Integrity verification enables the processor to determine that the first configuration file has not been tampered with.

At block 215, based on the validation of the first configuration file, the processor may execute the alternate firmware to validate the second configuration file. The second configuration file includes a second backup configuration. According to some examples, the process of validation may include verification of the integrity of the second configuration file. As discussed herein, the first and second configuration files with verified integrity may indicate that the backup configuration stored in them can be trusted configurations.

At block 220, in response to the validation of at least one of the first configuration file and the second configuration file, the processor may select one of the backup configurations. That is, the processor may select the first backup configuration and the second backup configuration from the first configuration file and the second configuration file, respectively. The selected backup configuration is applied to the node, such that the node is configured with a trusted configuration. As used herein, a configuration can be a set of settings (e.g., Internet Protocol (IP) addresses, credentials, directory details, etc.) of a node. In some examples, a configuration may include values for security settings, hardware enablers, hardware speed settings, voltage settings, license settings, credentials, etc.

In some examples, the method 200 may be repeated continually during boot operation of the node, during normal operation of the computing device, during a low power state of the computing device, or a combination of such states. The method may include additional blocks/steps that are discussed herein.

Figure 3:
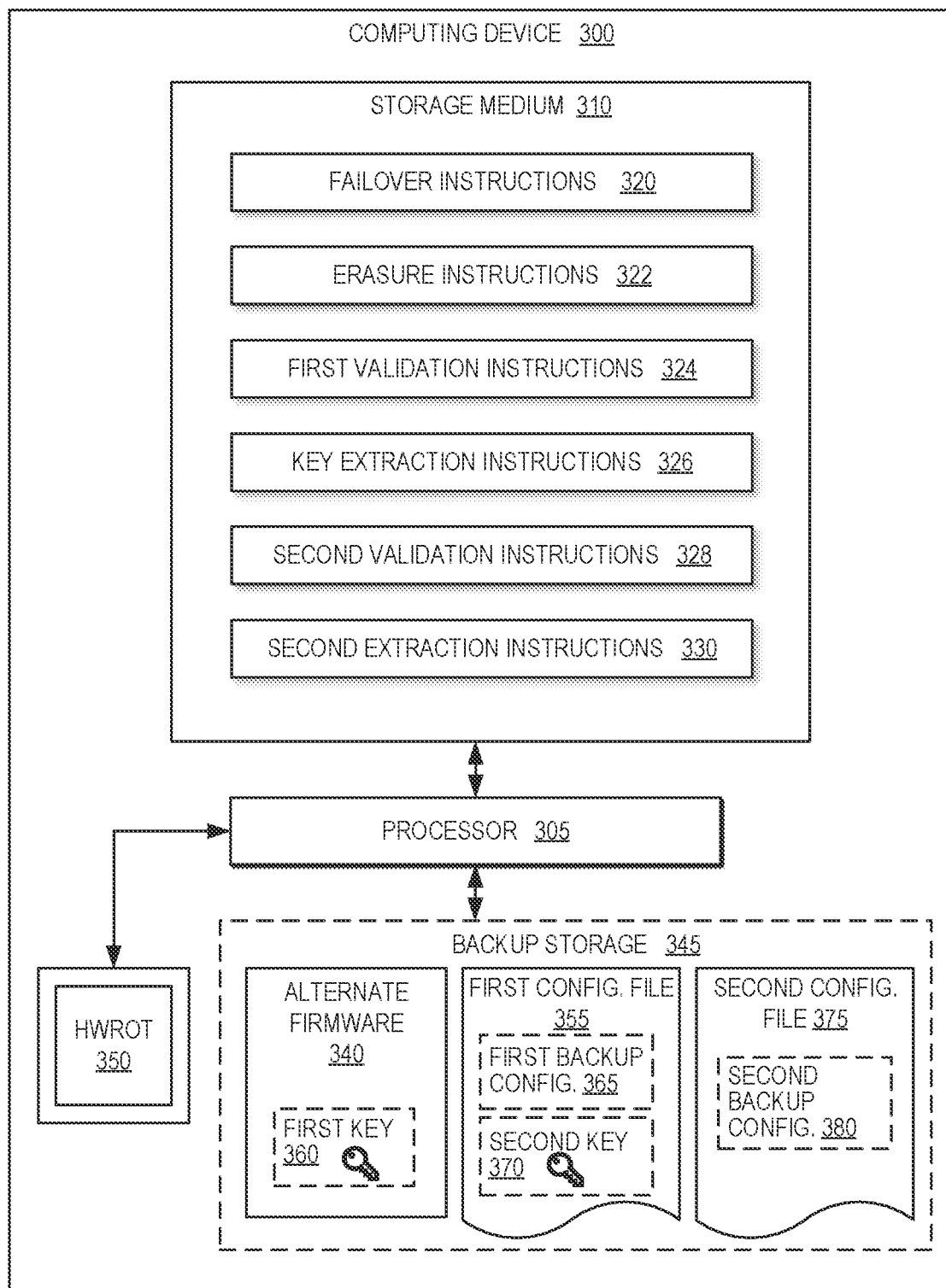
FIG. 3 illustrates a schematic view of a computing device capable of restoring a backup configuration of a node, according to various examples of the present disclosure.

FIG. 3 illustrates a schematic view of a computing device capable of restoring a backup configuration of a node, according to various examples of the present disclosure. The computing device 300 can be similar to the node 150A of FIG. 1, per one example. The computing device 300 may include a processor 305 and a storage medium 310 storing instructions 320-330. In some examples, the computing device 300 may include a main processor, a management processor, a security co-processor, etc. to perform one or more operations discussed herein. Further, the computing device 300 includes an existing firmware (not shown), and a backup copy of a trusted firmware (e.g., alternate firmware 340). The alternate firmware 340 may be used for recovery purposes when the integrity of the existing firmware is not validated. The alternate firmware 340 can be stored on non-volatile memory, such as a backup storage 345. In one example, the alternate firmware 340 is stored in a manner that can be executable by the processor 305. In a further example, the existing firmware/alternate firmware 340 may include a boot code for startup of the computing device 300 during power ON or a reset process.

Further, the computing device 300 includes an HWRoT 350, which enables a validated firmware to be loaded onto the computing device 300. In one example, HWRoT based boot process is anchored in hardware so that it is immutable (e.g., cannot be modified/updated). In some examples, the HWRoT 350 employs a chain of cryptographic operations that are triggered within the hardware and enables a seamless transition to the firmware. In one example, prior to the execution of instructions (e.g., the existing firmware), the HWRoT 350 can be employed to validate if the existing firmware is unverifiable. In one example, the HWRoT 350 may determine if the integrity of instructions corresponding to the existing firmware is intact or compromised.

Further, the processor 305 may be configured to fetch, decode, and execute instructions 320-330 that cause the processor to perform one or more actions. In some examples, the processor 305 may execute failover instructions 320 that cause the processor 305 to failover to the alternate firmware 340, based on the unverifiable condition of the existing configuration of the computing device 300. In some examples, the processor may cause the HWRoT 350 to validate the existing configuration of the computing device 300. As used herein, an "existing configuration" can be a default configuration before attempting to update the node to a trusted backup configuration.

In some examples, the HWRoT 350 may create a trigger that causes the processor 305 to prevent execution of compromised firmware (e.g., tampered existing firmware) and to failover the alternate firmware 340.

According to some examples, the processor 305 may execute erasure instructions 322 that cause the processor to erase an existing configuration of the computing device 300. According to some examples, the processor may execute the alternate firmware 340 and may initiate a boot process. Further, during the boot process or upon startup, the alternate firmware 340 may disregard and erase the existing configuration of the computing device 300.

In some examples, the processor 305 may execute first validation instructions 324 that cause the processor 305 to validate a first configuration file 355 with a first key 360 stored in the alternate firmware 340. As used herein, a first configuration file is a data set embedded with a first backup configuration 365, which is taken during the first stage of deployment of the node. The first configuration file 355 may include a first backup configuration 365 and a second key 370. In one example, the first backup configuration 365 can be a trusted configuration created and embedded into the first configuration file 355. The first configuration file 355 can be digitally signed during the first stage (e.g., manufacturing stage) of the computing device 300. In one example, the manufacturing stage may be a stage in the lifecycle of the computing device 300, which is before the computing device leaves the manufacturing facility. In another example, the first stage is not limited to the manufacturing stage and may include a stage subsequent to a manufacturing stage.

In some examples, the processor 305 may execute key extraction instructions 326 that cause the processor 305 to extract the second key 370 in response to validation of the first configuration file 355. As used herein, a "configuration file" is a set of data organized into a structure, such as tar, zip, Binary Large Object (BLOB), or other file formats. The first configuration file 355 may be stored in the backup storage 345 of the computing device 300. In one example, the first configuration file 355 includes the first backup configuration 365 and the second key 370 organized into a structure. Further, validation of the first configuration file 355 may include a digital signing and verification process involving a key pair with two keys, a private key, and a public key. The validation process enables verification of the first configuration file 355 to check if it is altered-intentionally or unintentionally-after it was signed. In one example, the process of validation using a digital signature may include generating a hash of the first configuration file and encrypting the hash using a private key. The generated hash is unique to the first configuration file and any alteration of the first configuration file 355 may result in a different hash. During validation of the first configuration file 355, a hash is generated for the first configuration file 355. The encrypted hash can be decrypted using a public key and the decrypted hash may be compared with the latest generated hash. Based on the condition that both the hashes match, the processor 305 may determine that the first configuration file 355 is valid.

In some examples, a command line utility, such as Open Secure Sockets Layer (SSL) may provide tools used to digitally sign configuration files. According to some examples, Open SSL may be used for generating a private key and a public key. Further, for the purposes of signing, Open SSL may be used that can perform hashing and encrypt the hash. In some examples, a first configuration file can be signed using an Open SSL call. To validate the first configuration file, the alternate firmware may create an OpenSSL call and provide the public key and the first configuration file, as parameters. In some examples, a hashing algorithm used may have to be specified for using an Open SSL call. Based on the successful verification of the first configuration file using the public key (e.g., the first key) of an asymmetric cryptographic scheme, the first configuration file is considered to be validated.

In some examples, the processor 305 may execute second validation instructions 328 that cause the processor 305 to validate a second configuration file 375 using the second key 370. The second configuration file 375 includes a second backup configuration 380. To verify the integrity of the second configuration file 375, it is validated using the second key 370 using cryptographic techniques. In some examples, the second configuration file 375 can be in a format similar to or different from the first configuration file 355.

In some examples, the processor 305 may execute second extraction instructions 330 that cause the processor 305 to, in response to validation of the second configuration file, extract the second backup configuration 380 and apply it to the computing device 300. The extraction can be in response to the validation of the second configuration file 375. The second backup configuration 380 can be a trusted configuration of the computing device 300 taken during a second stage, which can be at a deployment site. The second stage can be a trusted state subsequent to the first stage of the computing device 300. In one example, the second stage can be after deployment and reconfiguration at the customer end. In some other examples, the second stage can be deployment at a data center, at a public/private cloud facility, on-premise of a customer or enterprise, or other deployments.

In some examples, a processor of a node may interact with and cause a security device to perform certain cryptographic operations, such as the generation of a key pair, signing, etc. In one example, a processor may interact with a Trusted Platform Module (TPM) to perform cryptographic operations and the TPM may act as the security device. In another example, a processor may interact with a BMC to perform certain cryptographic operations. The BMC may include a security subsystem that is configured to perform various cryptographic operations and the security subsystem may act as the security device.

Figure 4:
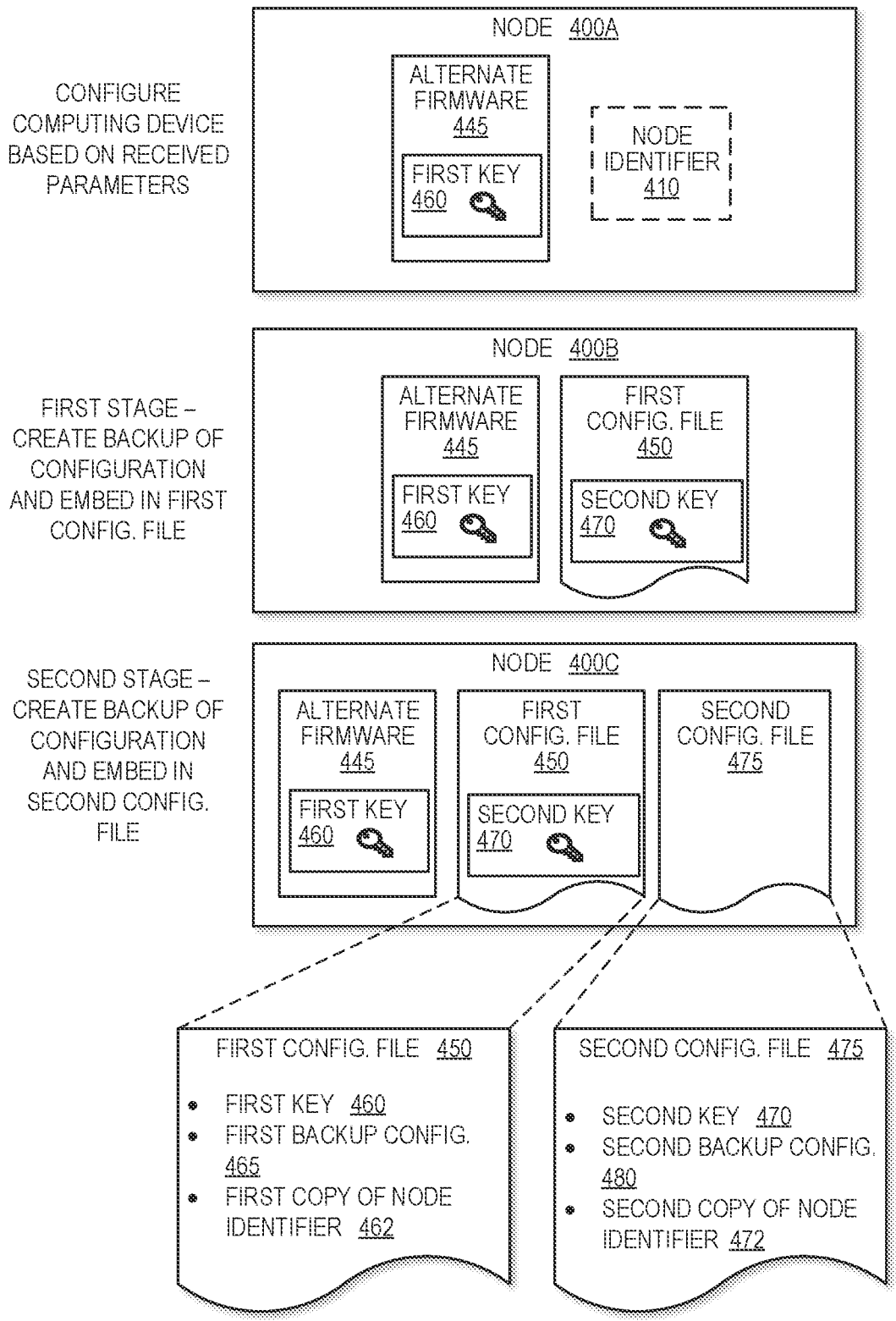
FIG. 4 depicts a schematic view of an example interaction between various components for backup and retrieval of backup configuration, according to the present disclosure.

FIG. 4 illustrates various stages of a node for the creation of backup and restoration of trusted configuration, in accordance with various examples of the present disclosure. The node 400A can be one of many nodes deployed in a data center. In one example, the node 400A can be similar to a computing device 300 of FIG. 3. In the ongoing example, the node 400A is also referred to by reference signs '400B' and '400C' to indicate a change due to the creation of trusted backup configuration.

The node 400A may be provided with a tamper-proof unique identifier that may be used to uniquely identify the device. During the manufacturing stage of the node 400A, a node identifier 410 is issued to the node 400A. The node identifier 410 can be an identifier that is cryptographically bound to a device. In one example, the node identifier 410 can be an IDevID/IDevID certificate. An IDevID certificate contains binding information that is bound to a cryptographic key for the manufacturer and immutable data on the node. The binding information may contain identifiers that specifically identify the physical attributes of the node. For example, the IDevID certificate for a particular node may have physical attributes, such as a node serial number, or similar unique references. Thus, for validating the node identifier 410, a serial number embedded into the node identifier 410 may be checked to match a one-time serial number programmed into the node 400A. As used herein, a "node identifier" is a secure node identifier that is cryptographically bound to a node. The node identifier may include a public key certificate based on X.509 and an associated private key that is stored securely.

In accordance with one example, the node 400A receives the node identifier 410, such as an IDevID, from a manufacturer. The node identifier 410 may be signed by a digital signing authority during the initial factory provisioning phase of the node. The signing service uses a private key that may have a chain of trust to a Certificate Authority. The IDevID may be signed by a private key generated by a CA and the IDevID can be available and protected for the entire device's lifetime (e.g., until the device can be functional/operational), where the IDevID includes an initial unique identifier of a node 400A.

According to the IEEE 802.1AR standard, the IDevID certificate can be provisioned during the factory manufacturing stage of the node. A manufacturer, an enterprise, or a technology provider may sign the certificate(s). A signing entity may ensure that public keys are indeed associated with the private keys of the requestor. A cryptographic key pair can be used for such a signing process. In one example, a public key of a key pair generated during the manufacturing stage is referred to as the first key 460. The first key 460 may be embedded into an alternate firmware 445 of the node 400A.

Further, the node 400A may be configured with a set of settings based on the parameters received. In one example, the parameters received may be based on a Customer Intent Document (CID). In some examples, the parameters may include a static Internet Protocol (IP) configuration, authentication mechanism(s), directory server details, memory alignment information, fan speed settings, power usage settings, security settings, or similar information. The static IP configuration may be used by a node to connect to an enterprise network (e.g., a customer's network). The authentication mechanism can be a login-password or other credentials. Upon configuring the node 400A with the configuration based on the aforementioned parameters, the node 400A is configured to take a first backup configuration 465.

To indicate the node undergoing the first backup configuration process, it is indicated by reference sign '400B.' In some examples, the node 400B may export the configuration (e.g., the first backup configuration 465) to a recovery storage, a secure storage, or other storage means. Further, the exported configuration may be embedded into a first configuration file 450. In some examples, the first configuration file 450 can be a Secure Blob file. In some other examples, the first configuration file 450 can be in the form of any organized data. In some further examples, the first configuration file 450 may be embedded with a public key (e.g., a second key 470) that may be used for validation at a later stage. In some examples, the first configuration file 450 is embedded with a copy of the node identifier (e.g., IDevID) of the node 400A, which is referred to as a first copy of node identifier 462. Further, the first configuration file 450 is digitally signed by the private key associated with the first key 460 by the manufacturer. In some further examples, the second configuration file 475 is embedded with a copy of the node identifier (e.g., IDevID) of the node 400A, which is referred to as a second copy of node identifier 472. The copies of node identifiers can be used to validate the integrity of the configuration files by comparing them with a node identifier available on the node 400A.

The node 400B may be shipped from the manufacturing facility/factory to a deployment field. Thus, the node 400B may be at a second stage and may perform a second backup configuration process and hence, referred to as '400C.' At the customer end, the node 400O may be updated with a customer desired settings thereby causing a change in the configuration. In some examples, the node 400O is configured to detect a change in the configuration and may export its latest trusted configuration (e.g., the second backup configuration 480). In some other examples, every time a change in the configuration is detected and the node 400O is in a trusted state, the corresponding backup configuration may be exported. In some examples, a latest backup configuration may replace an earlier backup configuration. In some other examples, all backup configurations may be retained by the node 400O.

In the ongoing example, the exported configuration, which is the second backup configuration 480, is embedded into a second configuration file 475. The second configuration file 475 may be signed by the customer/enterprise such that the file can be validated at a later point in time during the restoration of the trusted configuration.

In the event of an unverifiable condition of the existing firmware, the node 4000 fails over to the alternate firmware 445. Upon startup of the alternate firmware 445, the alternate firmware 445 validates the first configuration file 450 using the first key 460 compiled into it. In some examples, the first key can be a public key that can be used to validate the first configuration file 450. A processor (e.g., the processor 305 of FIG. 3) may perform the validation process. In some examples, the validation process may include confirming that the node identifier 410 (e.g., the IDevID) is signed by the authorized signatory by first authenticating the IDevID. In some further examples, validation of the IDevID may include determining that a serial number from a server Field Replacement Unit (FRU) or other one-time programmed serial number of the server matches with a serial number embedded into the IDevID. Further to validation of the serial number, the process may include determining that an IDevID embedded in the first configuration file is identical to the IDevID provisioned to the node 4000. Based on successful validation of the first configuration file 450, the second key 470 embedded into the first configuration file may be extracted.

Further, upon validation of the first configuration file 450, the alternate firmware may proceed to validate the second configuration file 475. For the purpose of validation of the second configuration file, the second key 470 is used, per some examples. In one example, the second key 470 can be a customer public code signing key and an associated private key may have been used to sign the second configuration file 475. As used herein, a "code signing key" may refer to a process of putting a digital signature on a program, file, software update, or executable, such that its authenticity and integrity can be verified. Upon successful validation of the second configuration file, the alternate firmware may cause extraction of the second backup configuration 480.

In some examples, the extracted second backup configuration 480 may be applied to the node 4000, such that the node 4000 is updated with a trusted configuration. In the event of failure to validate the second configuration file, the first backup configuration 465 may be extracted from the first configuration file. The node 4000 may be updated with such extracted first configuration. Thus, the node 4000 may be updated with the trusted configuration thereby updating the node 4000 to a state it was configured to before leaving the manufacturing facility. In either of the scenarios, the node is updated with a firmware configuration or the like that is trusted. Moreover, the process discussed herein ensures that the configuration applied is bound to the specific node.

In accordance with the illustrative example, the node may be at least one of a server, a networking switch, a computing node, a mobile device, a handheld device, a portable device, a non-portable device, a server desktop, a desktop computer, or any other processing devices with a non-transitory storage medium, or similar component(s). Other end of a network connection may be at least one of a cloud-based management server, managing, for example, compute or storage nodes, another node in the cluster, a remote node, a server, a computing node, a client node, a monitoring node, a mobile device, a handheld device, a portable device, a non-portable device, a server desktop, a desktop computer, a computer cluster, a console, a handheld console, a central node, a central monitoring system, or any other processing devices.

Figure 5:
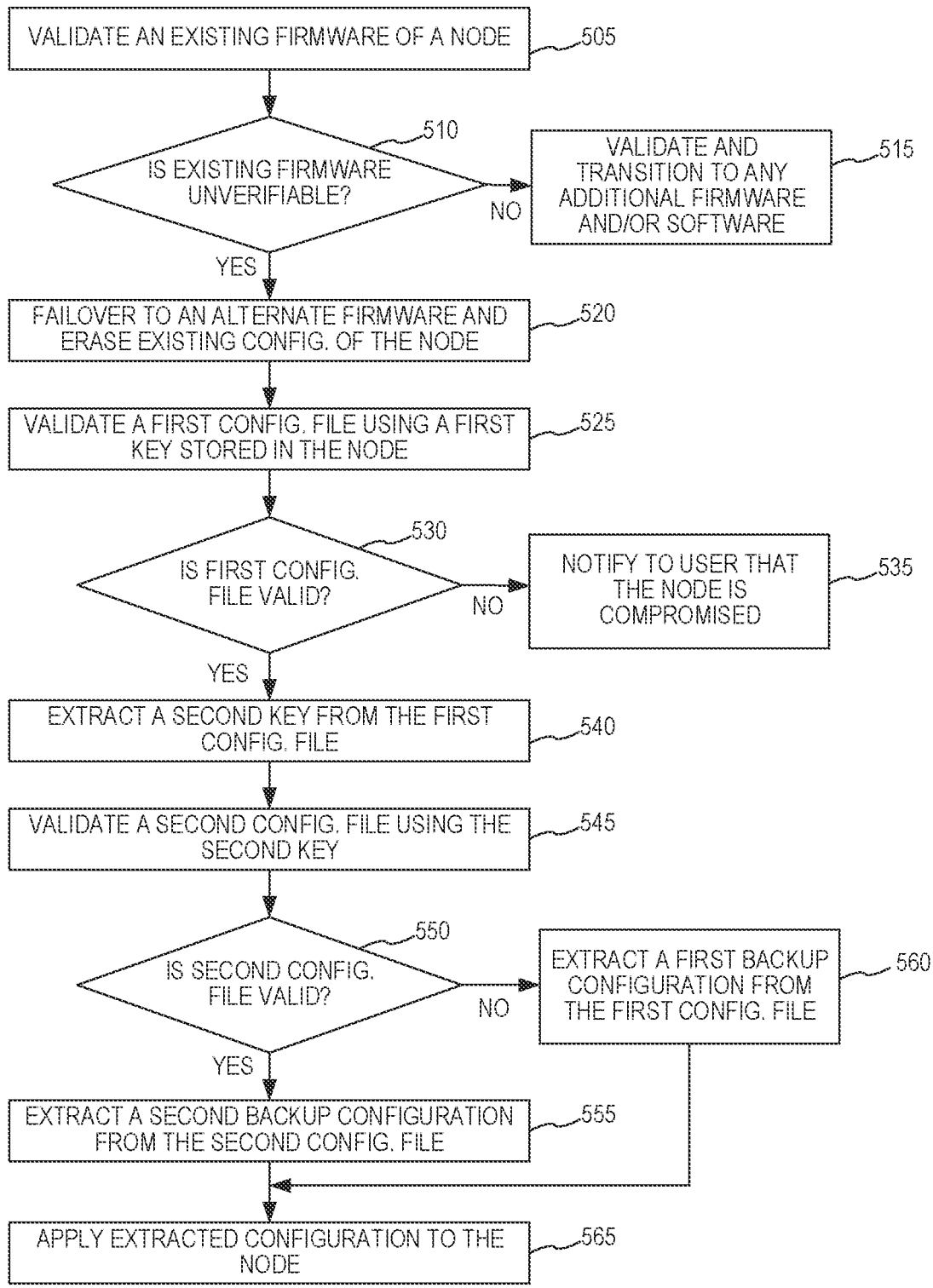
FIG. 5 illustrates an example flow diagram for a method of applying backup configuration to a node, per the present disclosure.

FIG. 5 illustrates a schematic view of a flow diagram indicating a method of operation for the selection and application of a trusted configuration to a computing device, according to various examples of the present disclosure. In some examples, instead of the main processor of the computing device/node executing all firmware instructions, a Baseboard Management Controller or a security device may execute a set of firmware instructions. In some further examples, certain firmware instructions, such as a "firmware stack," may be used for performing a variety of management-related functions (e.g., operating system runtime services, resource detection and initialization, pre-operating system services, and so forth).

In some examples, the BMC may also communicate with applications executing at the operating system level through an Input/Output Control (IOCTL) interface driver, a Representational State Transfer (REST) Application Program Interface (API), or some other system software proxy that facilitates communication between the baseboard management controller and applications. The BMC may have hardware-level access to hardware devices that are located in a node, such as a server, including system memory. The BMC may be capable of modifying the hardware devices. In some additional examples, the BMC may operate independently of the operating system of the node in which the BMC is disposed. The BMC may be located on the motherboard or main circuit board of the node. As alluded earlier, the BMC has management capabilities for sub-systems of a computing device and is separate from a processing resource that executes an operating system of a computing device.

Now referring to the flow diagram 500, according to some examples, at block 505, the node may validate an existing firmware. In some examples, the node may include an HWRoT to validate the existing firmware. The HWRoT can be used to verify the integrity of a firmware image, e.g., using private/public key-based digital signing techniques or any other validation techniques.

At block 510, the node may check if an existing firmware of the node is unverifiable. In some examples, a node may be unverifiable due to the existing firmware being tampered with. As per some examples, an HWRoT of the node may determine that a firmware image is unverifiable based on a failure of the validation procedure. In some examples, a security device of the node may be configured to perform HWRoT operations. The security device may include an encrypted hash embedded in it during chip fabrication at the manufacturing stage. Upon start, the security device may verify the existing firmware to determine whether to execute the firmware. The determination can be based on whether the existing firmware matches the encrypted hash that is permanently stored in the security device. In some examples, due to tampering with the existing firmware, the generated does not match with the encrypted hash embedded in the security device, thereby making it unverifiable. Further, in some examples, based on a condition that an existing firmware is verifiable (NO at block 510), the flow diagram may transition to block 515.

At block 515, the node may proceed to perform further validation steps. In one example, the node may include more than one firmware. The node may validate the existing firmware. Based on successful validation of the existing firmware, the node may transition to validation of any additional firmware and/or software that are included in the node.

Whereas, at block 520, based on a condition that an existing firmware is unverifiable (YES at block 510), the node may failover to an alternate firmware. In some examples, the node may include a secure recovery module, which can read a firmware image either from a local storage device such as NAND Flash, or via the network using Dynamic Host Configuration Protocol (DHCP), Preboot Execution Environment (PXE), and/or Hypertext Transfer Protocol Secure (HTTPS) boot options. Further, the alternate firmware may cause the node to erase any existing configuration of the node due to the unverifiable condition. The existing configuration of the node may not be trustable.

At block 525, the node may validate a first configuration file stored in the node. In some examples, the node may include two configuration files and the oldest of the two configuration files can be considered the first configuration file. In some other examples, two or more configuration files my available on the node and the node can be configured to validate in a sequence based on chronology, predefined hierarchy table, or any other conditions. In some examples, the node may validate the first configuration file using a first key stored in the alternate firmware.

At block 530, the node may check if the first configuration is valid using the first key. In some examples, a private key associated with the first key be used to cryptographically sign the first configuration file. Thus, the first key, which can be a public key out of a key pair, may be used to validate that the first configuration file that it is authentic and not tampered with.

At block 535, based on a condition that the validation of the first configuration file has failed (NO condition at block 530), the node may notify the user or network administrator that the node is compromised. Further, in some examples, the node may disable the further startup of the node. In some other examples, based on the condition that the validation has failed, the node may use a zeroed-out configuration file. That is, the node may run without a configuration, which can be similar to a pre-configuration condition of the node before leaving a factory.

At block 540, based on a validation of the first configuration file (YES at block 535), the node may extract a second key from the first configuration file. The second key can be a customer public code signing key. In some examples, the second key can be a public key out of a key pair and a private key of the key pair may be used to sign a second configuration file.

At block 545, the node may validate a second configuration file using the second key that was extracted from the first configuration file. The second configuration file includes a second backup configuration, which is exported from the node during a trusted state of the node.

At block 550, the node may check if the second configuration is valid using the second key. In some examples, a private key associated with the second key may be used to cryptographically sign the second configuration file. Thus, the second key, which can be a customer public key out of a key pair, may be used to validate that the second configuration file that it is authentic and not tampered with.

At block 555, based on a condition that the second configuration file is valid (YES at block 550), the node may extract the second backup configuration embedded into the second configuration file. Whereas, based on the condition that the second configuration file fails validation (NO at block 550), the node may extract the first backup configuration from the first configuration file.

At block 565, the extracted backup configuration (one of the first/second backup configurations) is applied to the node, such that the node is configured with a trusted configuration. In some examples, various settings of the node may be updated based on the details available in the extracted back configuration.

Although blocks shown in FIG. 5 are in a specific order, the order may not be exclusive. One or more blocks may be performed in any order, at any time, may be performed repeatedly, and/or may be performed by any suitable device or devices. Blocks 505-565 as illustrated in FIG. 5 can be instructions stored in a non-transitory storage medium, such as the storage medium 160 of FIG. 1. The instructions can be executed by a processor that causes the processor to perform one or more actions as discussed in blocks 505-565. The processor and the non-transitory storage medium can be part of a node or a computing device 105A/300/400C discussed earlier.

Figure 6:
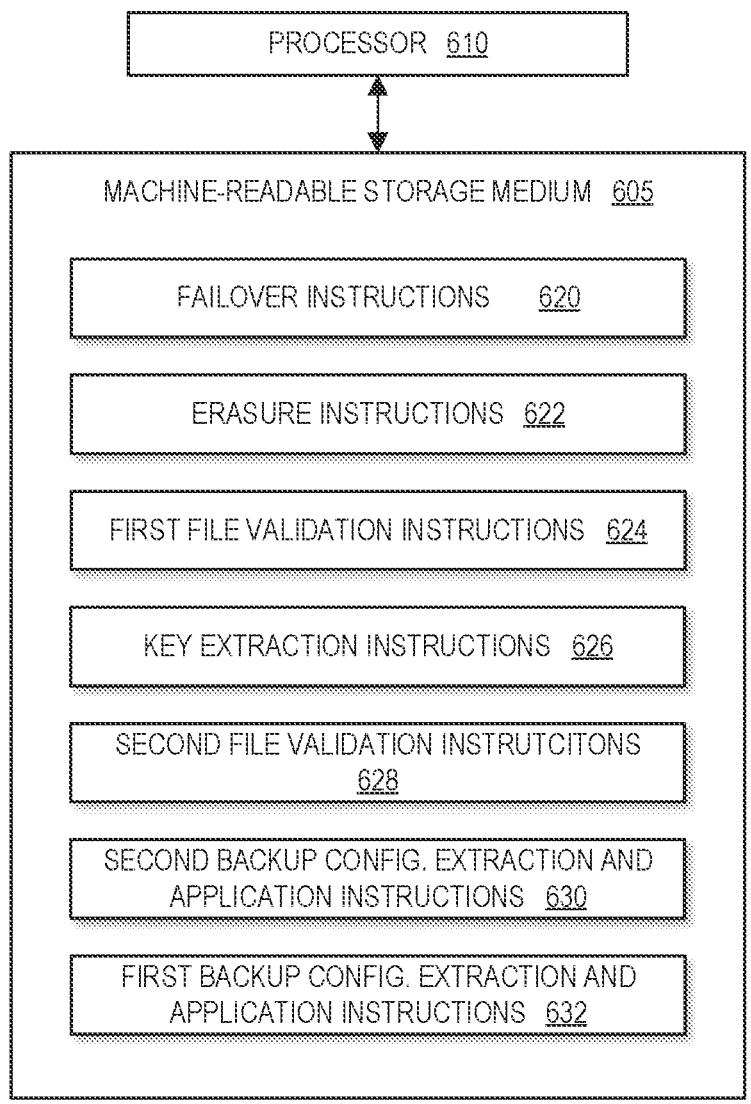
FIG. 6 depicts a schematic view of a storage medium storing instructions, in accordance with various examples of the present disclosure.

FIG. 6 depicts a block diagram of an example storage medium storing instructions used to perform techniques discussed herein. Furthermore, it should be appreciated that although the various instructions are illustrated as being co-located with a processor, one or more instructions may be executed remotely from the other instructions.

The instructions stored in the storage medium 605 may be executable by one or more processors 610. Processor(s) 610 may be, for example, one or more general-purpose microprocessors or specific-purpose microprocessors such as a BMC or a TPM. In some examples, the instructions may be read into the main memory from another storage medium, which is a non-transitory type. The term "non-transitory," and similar terms, may refer to any media that store data and/or instructions that cause a machine to operate in a specific fashion.

The storage medium 605 may store instructions, executable by the processor 610, to perform one or more actions as per the present disclosure. According to some examples, the failover instructions 620 may cause the processor, to failover to an alternate firmware based on an unverifiable condition of the existing firmware of a computing device.

The erasure instructions 622 may cause the processor, to erase an existing configuration of an existing firmware of a node, in response to the unverifiable condition of the existing firmware of the node. According to some examples, the erasure instructions 622 corresponding to an alternate firmware may initiate a boot process. Further, during the boot process or upon startup, the alternate firmware may disregard and erase the existing configuration.

The first file validation instructions 624 may cause the processor, to validate a first configuration file using a first key stored in an alternate firmware. The first configuration file includes a first backup configuration and a second key. According to some examples, the first backup configuration can be taken during a first stage of deployment of a node. In one example, the first backup configuration can be a trusted configuration created and digitally signed during the first stage (e.g., the manufacturing stage) of a node.

Further, the key extraction instructions 626 may cause the processor, to extract the second key from the first configuration file, in response to the validation of the first configuration file. In one example, a first backup configuration can be a trusted configuration created and embedded into the first configuration file. A private key corresponding to the second key, which is embedded into the first configuration file, may be used to sing the second configuration file.

The second file validation instructions 628 may cause the processor, to validate a second configuration file using the second key extracted from the first configuration file, where the second configuration file includes a second backup configuration. In some examples, validation of the second configuration file may include using hashing techniques as discussed herein. In some other examples, other known validation techniques may be used.

The second backup configuration extraction and application instructions 630, may cause the processor, to in response to validation of the second configuration file, extract the second backup configuration from the second configuration file and apply the second backup configuration. The second backup configuration can be the latest trusted configuration that can be used to configure a node with the latest known trusted settings.

The first backup configuration extraction and application instructions 632, may cause the processor, to in response to failed validation of the second configuration file, extract the first backup configuration from the first configuration file and apply the first backup configuration to the computing device. The first configuration file is a backup file created during the first stage of the node lifecycle. The first stage includes at least one of a manufacturing stage and a factory reset stage of the node. The second configuration file is a backup file created during the second stage of the node. The second stage includes an operational state of the node with an updated configuration. The instructions may include further instructions that cause the processor, to create a secure communication and provide the first key and the first configuration file as parameters. Further, the instructions may include instructions to validate the first configuration file based on asymmetric cryptography using a private key corresponding to the first key.

In general, the memory devices described herein, may be formed from non-transitory memory devices, such as semiconductor storage devices, flash memory devices, memristors, phase change memory devices, a combination of one or more of the foregoing storage technologies, and so forth. Moreover, the memory devices may be volatile (e.g., dynamic random-access memory (DRAM) devices, static random access (SRAM) devices, and so forth) or non-volatile memory devices (e.g., flash memory devices, read-only memory (ROM) devices and so forth), unless otherwise stated herein.

Wherever possible, the same reference numbers may be used in the drawings and the following description to refer to the same or similar parts. While several examples are described in the description, modifications, adaptations, and other examples are possible. Accordingly, the detailed description does not limit the disclosed examples. Instead, the proper scope of the disclosed examples may be defined by the appended claims.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N." Additionally, use herein of a reference numeral without an index number, where such reference numeral is referred to elsewhere with an index number, may be a general reference to the corresponding plural elements, collectively or individually.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and subcombinations are intended to fall within the scope of this disclosure, and certain methods or process blocks may be omitted in some examples.

In general, the word "device," "component," "system," "database," "data store," and the like, can refer to logic embodied in hardware or firmware, or to a collection of software instructions, possibly having entry and exit points, written in any known programming language. Software components configured for execution on computing devices may be provided on a computer-readable medium.

While several examples are described in this document, modifications, adaptations, and other examples are possible. Accordingly, the following detailed description does not limit disclosed examples. Instead, the proper scope of the disclosed examples may be defined by the appended claims. The terminology used herein can be to describe particular examples and can be not intended to be limiting. As used herein, the singular forms "a," "an," and "the" are intended to include the plural forms as well, unless the context clearly indicates otherwise. Also, the terms "includes," "including," "comprises," "comprising," "have," or "having" when used in this disclosure specify the presence of the stated elements, but do not preclude the presence or addition of other elements.

The term "another," as used herein, can be defined as at least a second or more. The term "coupled," as used herein, can be defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein may refer to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but is not limited to, the term "including" means including but not limited to. The term "based on" means based at least in part on.

What is claimed is:

1. A method, comprising:
   failing over, by a processor of a node, to an alternate firmware of the node, in response to an unverifiable condition of an existing firmware of the node;
   validating, by the processor executing the alternate firmware, a first configuration file stored in the node, wherein the first configuration file includes a first backup configuration;
   validating, by the processor executing the alternate firmware, a second configuration file stored in the node based on validation of the first configuration file, wherein the second configuration file includes a second backup configuration; and
   in response to validation of at least one of the first configuration file and the second configuration file, selecting, by the processor executing the alternate firmware, one of the first backup configuration and the second backup configuration, and applying the selected backup configuration to the node.

2. The method of claim 1, wherein selecting includes:
   in response to validation of the second configuration file, extracting, by the processor, the second backup configuration from the second configuration file and selecting the second backup configuration for application to the node.

3. The method of claim 2, wherein selecting further includes:
in response to failed validation of the second configuration file, extracting, by the processor, the first backup configuration from the first configuration file and selecting the first backup configuration for application to the node.

4. The method of claim 2, wherein validating the first configuration file, includes:
retrieving, by the processor executing the alternate firmware, a first key compiled into the alternate firmware; and
validating, by the processor executing the alternate firmware, the first configuration file using the first key.

5. The method of claim 4, wherein the first key is a public key compiled into the alternate firmware during a manufacturing stage of the node.

6. The method of claim 4, further comprising:
validating, by the processor, that a node identifier provisioned to the node is digitally signed by an authorized entity; and
based on validation of the node identifier, validating, by the processor, that a serial number embedded into the node identifier matches an immutable serial number programmed into the node.

7. The method of claim 6, further comprising:
based on validation of the serial number, validating, by the processor, that a copy of a node identifier embedded into the first configuration file matches the node identifier embedded into the node.

8. The method of claim 6, wherein the node identifier is an Initial Device Identifier (IDevID) based on Institute of Electrical and Electronics Engineers (IEEE) 802.1AR DevID standard.

9. The method of claim 3, wherein validating the second configuration file, includes:
retrieving, by the processor, a second key from the first configuration file, wherein the second key is a public code signing key embedded into the first configuration file during a first stage of the node; and
validating, by the processor, the second configuration file using the second key.

10. The method of claim 9, further comprising:
validating, by the processor, that an additional copy of a node identifier embedded into the second configuration file matches the node identifier provisioned to the node.

11. The method of claim 1, further comprising:
creating, by the processor, the first configuration file by embedding the first backup configuration before the node leaves a factory, wherein the first backup configuration is created based on configuration information received during an initial configuration of the node.

12. The method of claim 1, further comprising:
creating, by the processor, the second configuration file by embedding the second backup configuration when the node is operating in a deployment site.

13. A computing device, comprising:
a processor; and
a storage medium operatively connected to the processor and storing instructions that when executed, causes the processor to:
failover to an alternate firmware, based on an unverifiable condition of an existing firmware of the computing device;
erase an existing configuration of the computing device;
validate a first configuration file with a first key stored in the alternate firmware, wherein the first configuration file includes a first backup configuration and a second key;
extract the second key in response to validation of the first configuration file;
validate a second configuration file using the second key, wherein the second configuration file includes a second backup configuration; and
in response to validation of the second configuration file, extract the second backup configuration from the second configuration file and apply the second backup configuration.

14. The computing device of claim 13, wherein the first key is stored in a backup storage and the backup storage is at least one of a local storage of the computing device, a storage medium connected to the computing device via a network, and an emergency recovery partition of the computing device.

15. The computing device of claim 13, wherein the first configuration file and the second configuration file are in a file package format readable in a machine-readable format.

16. The computing device of claim 13, wherein the computing device includes a Hardware Root of Trust (HWRoT), and the HWRoT is configured to validate authenticity of at least one of the existing firmware and the alternate firmware.

17. The computing device of claim 13, wherein the computing device includes a security device capable of performing at least one of a key pair generation and secure storage of a private key of the generated key pair.

18. A non-transitory storage medium storing instructions, the instructions executable by a processor, to:
erase an existing configuration of an existing firmware of a node, in response to an unverifiable condition of the existing firmware of the node;
validate a first configuration file using a first key stored in an alternate firmware, wherein the first configuration file includes a first backup configuration and a second key;
extract the second key from the first configuration file, in response to validation of the first configuration file;
validate a second configuration file using the second key extracted from the first configuration file, wherein the second configuration file includes a second backup configuration;
in response to validation of the second configuration file, extract the second backup configuration from the second configuration file and apply the second backup configuration; and
in response to failed validation of the second configuration file, extract the first backup configuration from the first configuration file and apply the first backup configuration.

19. The non-transitory storage medium of claim 18, wherein:
the first configuration file is a backup file created during a first stage of the node, and the first stage includes at least one of a manufacturing stage and a factory reset stage of the node; and
the second configuration file is a backup file created during a second stage of the node, and the second stage includes an operational state of the node with an updated configuration.

20. The non-transitory storage medium of claim 18, wherein the instructions to validate the first configuration file, includes instructions to:

create a secure communication and provide the first key and the first configuration file as parameters; and validate the first configuration file based on a digital signature process using the first key and a private key corresponding to the first key.

\* \* \* \* \*